US012573634B2

(12) United States Patent
Yoon et al.

(10) Patent No.: US 12,573,634 B2
(45) Date of Patent: Mar. 10, 2026

(54) SILICON-CONTAINING ELECTRODES AND METHODS FOR PREPARING THE SAME

(71) Applicant: GM GLOBAL TECHNOLOGY OPERATIONS LLC, Detroit, MI (US)

(72) Inventors: Insun Yoon, Shelby Township, MI (US); Meixian Wang, Troy, MI (US); Ion C. Halalay, Grosse Pointe Park, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 675 days.

(21) Appl. No.: 17/954,896

(22) Filed: Sep. 28, 2022

(65) Prior Publication Data

US 2024/0120486 A1 Apr. 11, 2024

(51) Int. Cl.

| | |
|---|---|
| ***H01M 4/62*** | (2006.01) |
| ***H01M 4/02*** | (2006.01) |
| ***H01M 4/36*** | (2006.01) |
| ***H01M 4/38*** | (2006.01) |
| ***H01M 4/583*** | (2010.01) |
| ***H01M 10/0525*** | (2010.01) |
| ***H01M 50/46*** | (2021.01) |

(52) U.S. Cl.

CPC ........... *H01M 4/622* (2013.01); *H01M 4/364* (2013.01); *H01M 4/386* (2013.01); *H01M 4/583* (2013.01); *H01M 10/0525* (2013.01); *H01M 50/46* (2021.01); *H01M 2004/027* (2013.01); *H01M 2220/20* (2013.01)

(58) Field of Classification Search

None

See application file for complete search history.

(56) References Cited

U.S. PATENT DOCUMENTS

| | | | |
|---|---|---|---|
| 899,584 A | 9/1908 | Whitaker | |
| 8,440,350 B1 | 5/2013 | Verbrugge et al. | |

(Continued)

FOREIGN PATENT DOCUMENTS

| | | | |
|---|---|---|---|
| CN | 114388767 A * | 4/2022 | .......... H01M 4/1395 |
| CN | 117790791 A | 3/2024 | |
| DE | 102023111254 A1 | 3/2024 | |

OTHER PUBLICATIONS

CN-114388767-A English machine translation (Year: 2022).*

(Continued)

*Primary Examiner* — Scott J. Chmielecki

(74) *Attorney, Agent, or Firm* — Harness, Dickey & Pierce, P.L.C.

(57) ABSTRACT

An electrochemical cell may include a first electrode that includes a positive electroactive material, a second electrode that includes a negative electroactive material and a poly-acrylate binder, and a separating layer disposed between the first and second electrodes. The polyacrylate binder has a molecular weight greater than or equal to about 250,000 mol/g to less than or equal to about 500,000 mol/g. The second electrode is prepared by disposing an electrode forming slurry having a temperature greater than or equal to about 4° C. to less than or equal to about 15° C. one or near a surface of a current collector. The electrode forming slurry includes the negative electroactive material and the poly-acrylate binder. The negative electroactive material can be a silicon-containing material.

17 Claims, 5 Drawing Sheets

(56) References Cited

U.S. PATENT DOCUMENTS

| | | | |
|---|---|---|---|
| 8,859,144 B2 | 10/2014 | Xiao | |
| 8,999,584 B2 | 4/2015 | Jiang et al. | |
| 9,005,811 B2 | 4/2015 | Xiao et al. | |
| 9,093,705 B2 | 7/2015 | Xiao et al. | |
| 9,142,830 B2 | 9/2015 | Xiao et al. | |
| 9,302,914 B2 | 4/2016 | Liu et al. | |
| 9,362,551 B2 | 6/2016 | Sachdev et al. | |
| 9,379,374 B2 | 6/2016 | Liu et al. | |
| 9,531,004 B2 | 12/2016 | Xiao et al. | |
| 9,564,639 B2 | 2/2017 | Huang | |
| 9,570,752 B2 | 2/2017 | Huang et al. | |
| 9,577,251 B2 | 2/2017 | Xiao et al. | |
| 9,780,361 B2 | 10/2017 | Xiao et al. | |
| 10,062,898 B2 | 8/2018 | Xiao | |
| 10,141,569 B2 | 11/2018 | Verbrugge et al. | |
| 10,164,245 B2 | 12/2018 | Huang | |
| 10,476,074 B2 | 11/2019 | Xiao et al. | |
| 10,593,988 B2 | 3/2020 | Xiao et al. | |
| 10,803,687 B1 | 10/2020 | Khamis et al. | |
| 10,854,882 B2 | 12/2020 | Halalay et al. | |
| 10,868,307 B2 | 12/2020 | Huang | |
| 10,892,481 B2 | 1/2021 | Balogh et al. | |
| 10,950,846 B2 | 3/2021 | Xiao et al. | |
| 10,985,363 B2 | 4/2021 | Xiao et al. | |
| 11,011,742 B2 | 5/2021 | Sachdev et al. | |
| 11,228,037 B2 | 1/2022 | Huang et al. | |
| 11,316,142 B2 | 4/2022 | Jiang et al. | |
| 11,342,545 B2 | 5/2022 | Cain et al. | |
| 11,349,119 B2 | 5/2022 | Halalay et al. | |
| 11,374,218 B2 | 6/2022 | Jiang et al. | |
| 11,424,442 B2 | 8/2022 | Frieberg et al. | |
| 11,753,305 B2 | 9/2023 | Liu et al. | |
| 11,769,872 B2 | 9/2023 | Huang et al. | |
| 11,824,186 B2 | 11/2023 | Frieberg et al. | |
| 11,848,440 B2 | 12/2023 | Frieberg et al. | |
| 12,034,144 B2 | 7/2024 | Yu et al. | |
| 12,040,494 B2 | 7/2024 | Yang et al. | |
| 2018/0205114 A1 | 7/2018 | Pauric et al. | |
| 2018/0375095 A1* | 12/2018 | Ma | H01M 4/386 |
| 2019/0198934 A1 | 6/2019 | Liu et al. | |
| 2020/0176755 A1 | 6/2020 | Huang et al. | |
| 2020/0227728 A1 | 7/2020 | Huang et al. | |
| 2020/0350558 A1 | 11/2020 | Jimenez et al. | |
| 2020/0377370 A1 | 12/2020 | Abd Elhamid et al. | |
| 2020/0388825 A1 | 12/2020 | Verbrugge et al. | |
| 2021/0020899 A1 | 1/2021 | Halalay et al. | |
| 2021/0066704 A1 | 3/2021 | Verbrugge et al. | |
| 2021/0135193 A1 | 5/2021 | Wang et al. | |
| 2021/0135194 A1 | 5/2021 | Wang et al. | |
| 2021/0151750 A1* | 5/2021 | Chen | H01M 4/623 |
| 2021/0151761 A1 | 5/2021 | Jimenez et al. | |
| 2021/0151764 A1 | 5/2021 | Ellison et al. | |
| 2021/0151765 A1 | 5/2021 | Ellison et al. | |
| 2021/0151787 A1 | 5/2021 | Xiao et al. | |
| 2021/0175491 A1 | 6/2021 | Frieberg et al. | |
| 2021/0234153 A1 | 7/2021 | Xiao et al. | |
| 2021/0296633 A1 | 9/2021 | Liu et al. | |
| 2021/0408517 A1 | 12/2021 | Bobel et al. | |
| 2022/0045326 A1 | 2/2022 | Cain et al. | |
| 2022/0069280 A1 | 3/2022 | Xiao et al. | |
| 2022/0102704 A1 | 3/2022 | Verbrugge et al. | |
| 2022/0102712 A1 | 3/2022 | Huang et al. | |
| 2022/0102725 A1 | 3/2022 | Xiao et al. | |
| 2022/0123279 A1 | 4/2022 | Mao et al. | |
| 2022/0140324 A1 | 5/2022 | Ellison et al. | |
| 2022/0238911 A1 | 7/2022 | Yang et al. | |
| 2022/0384776 A1 | 12/2022 | Cain et al. | |
| 2023/0006201 A1 | 1/2023 | Wang et al. | |
| 2023/0019313 A1 | 1/2023 | Mao et al. | |
| 2023/0102190 A1 | 3/2023 | Xiao et al. | |
| 2023/0231110 A1 | 7/2023 | Hou et al. | |
| 2023/0246161 A1 | 8/2023 | Su et al. | |
| 2023/0246242 A1 | 8/2023 | Hou et al. | |
| 2023/0299359 A1 | 9/2023 | Halalay et al. | |
| 2023/0387398 A1 | 11/2023 | Ellison et al. | |
| 2024/0030405 A1 | 1/2024 | Wang et al. | |
| 2024/0063365 A1* | 2/2024 | Wakita | H01M 4/622 |
| 2024/0318308 A1* | 9/2024 | Tillmann | C23C 16/4417 |

OTHER PUBLICATIONS

Zhongyi Liu et al.; U.S. Appl. No. 17/473,856, filed Sep. 13, 2021 entitled "Methods of Producing Pre-Lithiated Silicon Oxide Electroactive Materials Comprising Silicides and Silicates"; 50 pages.
Xingyi Yang et al.; U.S. Appl. No. 17/205,574, filed Mar. 18, 2021 entitled "Negative Electrodes for Secondary Lithium Batteries and Methods of Making the Same"; 29 pages.
Xiaosong Huang et al.; U.S. Appl. No. 17/204,126, filed Mar. 17, 2021 entitled "Pre-Lithiated Silicon Particles and Methods of Forming the Same"; 52 pages.
Bradley R. Frieberg et al.; U.S. Appl. No. 17/221,099, filed Apr. 2, 2021 entitled "Prelithiated Negative Electrodes Including Li—Si Alloy Particles and Methods of Manufacturing the Same"; 28 pages.
Bradley R. Frieberg et al.; U.S. Appl. No. 17/220,050, filed Apr. 1, 2021 entitled "Prelithiated Negative Electrodes Including Composite Li—Si Alloy Particles and Methods of Manufacturing the Same"; 26 pages.
Jeffrey David Cain et al.; U.S. Appl. No. 17/336,073, filed Jun. 1, 2021 entitled "Layered Anode Materials"; 36 pages.
Paul Taichiang Yu et al.; U.S. Appl. No. 17/486,378, filed Sep. 27, 2021 entitled "Solid-State Synthesis for the Fabrication of a Layered Anode Material"; 46 pages.
Leng Mao et al.; U.S. Appl. No. 17/698,874, filed Mar. 18, 2022 entitled "Lithium Alloy Reservoir for Use in Electrochemical Cells That Cycle Lithium Ions"; 38 pages.
Xingcheng Xiao et al.; U.S. Appl. No. 17/489,260, filed Sep. 29, 2021 entitled "Negative Electroactive Materials and Methods of Forming the Same"; 55 pages.
Nicole Ellison et al.; U.S. Appl. No. 17/824,601, filed May 25, 2022 entitled "Carbon Additives for Silicon-Containing Electrodes"; 42 pages.
Meixian Wang et al.; U.S. Appl. No. 17/869,389, filed Jul. 20, 2022 entitled "Composite Electrodes"; 58 pages.
Lei Wang et al.; U.S. Appl. No. 17/363,985, filed Jun. 30, 2021 entitled "Over-Lithiated Cathode Materials and Methods of Forming the Same"; 47 pages.
Qili Su et al.; U.S. Appl. No. 17/882,246, filed Aug. 5, 2022 entitled "Pre-Lithiation, Precursor Electrodes and Methods of Making and Using the Same"; 65 pages.
Mengyan Hou et al.; U.S. Appl. No. 17/884,234, filed Aug. 9, 2022 entitled "Electroactive Materials for High-Performance Batteries"; 45 pages.
Mengyan Hou et al.; U.S. Appl. No. 17/882,876, filed Aug. 8, 2022 entitled "Carbon-Coated Lithiated Silicon-Based Electroactive Materials and Methods of Making the Same"; 45 pages.
Ion C. Halalay et al.; U.S. Appl. No. 17/695,304, filed Mar. 15, 2022 entitled "Electrolyte Composition for Lithium-Ion Cells With Silicon Electrodes"; 35 pages.

* cited by examiner

SILICON-CONTAINING ELECTRODES AND METHODS FOR PREPARING THE SAME

INTRODUCTION

This section provides background information related to the present disclosure which is not necessarily prior art.

Advanced energy storage devices and systems are in demand to satisfy energy and/or power requirements for a variety of products, including automotive products such as start-stop systems (e.g., 12 V start-stop systems), battery-assisted systems, hybrid electric vehicles ("HEVs"), and electric vehicles ("EVs"). Typical lithium-ion batteries include at least two electrodes and an electrolyte and/or separator. One of the two electrodes may serve as a positive electrode or cathode and the other electrode may serve as a negative electrode or anode. A separator filled with a liquid or solid electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte (or solid-state separator), the solid-state electrolyte (or solid-state separator) may physically separate the electrodes so that a distinct separator is not required.

Many different materials may be used to create components for a lithium-ion battery. The negative electrode typically includes a lithium insertion material or an alloy host material. For example, typical electroactive materials for forming an anode include graphite and other forms of carbon, silicon and silicon oxide, tin, and tin alloys. Certain anode materials have particular advantages. While graphite having a theoretical specific capacity of 372 $mAh \cdot g^{-1}$ is most widely used in lithium-ion batteries, anode materials with high specific capacity, for example high specific capacities ranging about 900 $mAh \cdot g^{-1}$ to about 4,200 $mAh \cdot g^{-1}$, are of growing interest. For example, silicon has the highest known theoretical capacity for lithium (e.g., about 4,200 $mAh \cdot g^{-1}$), making it an appealing material for rechargeable lithium-ion batteries. Such materials, however, are often susceptible to huge volume expansion during lithiation and delithiation, which can lead to particle pulverization, loss of electrical contact, and unstable solid-electrolyte interface (SEI) formation, causing electrode collapse and capacity fading. Accordingly, it would be desirable to develop improved materials, and methods of making and using the same, that can address these challenges.

SUMMARY

This section provides a general summary of the disclosure, and is not a comprehensive disclosure of its full scope or all of its features.

The present disclosure relates to silicon-containing electrodes, to electrochemical cells including the same, and to methods of making and using the same.

In various aspects, the present disclosure provides an electrode for an electrochemical cell that cycles lithium ions. The electrode may include a silicon-containing electroactive material and a polyacrylate binder formed from a monomer selected from the group consisting of:

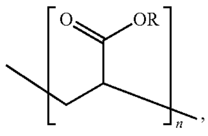

R = H, Li, Na, K, Mg, or Ca

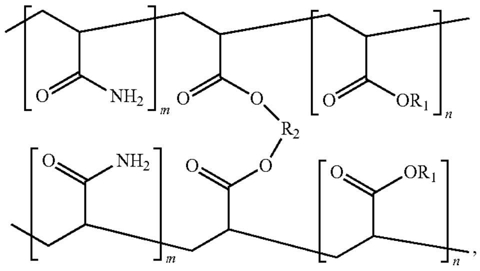

$R_1$ = H, Li, Na, or K; $R_2$ = Mg or Ca

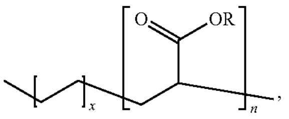

R = H, Li, Na, K, Mg, or Ca

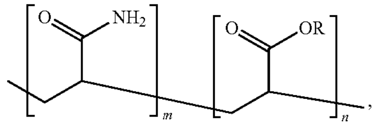

R = H, Li, Na, K, Mg, or Ca

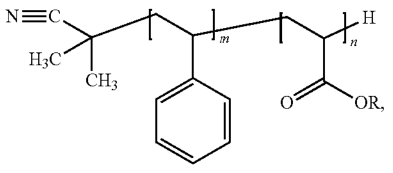

R = H, Li, Na, K, Mg, or Ca

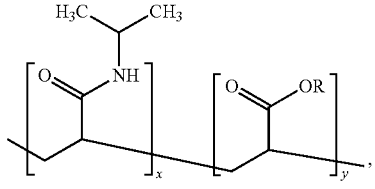

R = H, Li, Na, K, Mg, or Ca and combinations thereof.

In one aspect, the polyacrylate binder may have a molecular weight greater than or equal to about 250,000 g/mol to less than or equal to about 500,000 g/mol.

In one aspect, the electrode may include greater than or equal to about 0.5 wt. % to less than or equal to about 5 wt. % of the polyacrylate binder.

In one aspect, the electrode may further include greater than or equal to about 0.1 wt. % to less than or equal to about 5 wt. % of a conductive additive.

In one aspect, the electrode may further include greater than or equal to about 10 wt. % to less than or equal to about 50 wt. % of the silicon-containing electroactive material.

In one aspect, the electrode may further include a carbonaceous electroactive material.

In one aspect, the electrode may include greater than or equal to about 10 wt. % to less than or equal to about 50 wt. % of the silicon-containing electroactive material, and greater than or equal to about 40 wt. % to less than or equal to about 80 wt. % of the carbonaceous electroactive material.

In various aspects, the present disclosure provides an electrochemical cell that cycles lithium ions. The electrochemical cell may include a first electrode that includes a positive electroactive material, a second electrode that includes a negative electroactive material and a polyacrylate binder, and a separating layer disposed between the first and second electrodes. The polyacrylate binder may be selected from the group consisting of: poly(acrylic acid), poly(acrylic acid) fractional neutralized with magnesium, calcium, lithium, sodium, and/or potassium, poly(ethylene-co-acrylic acid), poly(ethylene-co-acrylic acid) fractional neutralized with magnesium, calcium, lithium, sodium, and/or potassium, poly(acrylamide-co-acrylic acid), poly(acrylamide-co-acrylic acid) fractional neutralized with magnesium, calcium, lithium, sodium, and/or potassium, poly styrene-block-poly (acrylic acid), polystyrene-block-poly(acrylic acid) fractional neutralized with magnesium, calcium, lithium, sodium, and/or potassium, poly(N-isopropylacrylamide-co-acrylic acid), poly(N-isopropylacrylamide-co-acrylic acid) fractional neutralized with magnesium, calcium, lithium, sodium, and/or potassium, and combinations thereof.

In one aspect, the polyacrylate binder may be a first polyacrylate binder and the first electrode may further include a second polyacrylate binder. The second polyacrylate binder may also be selected from the group consisting of: poly(acrylic acid), poly(acrylic acid) fractional neutralized with magnesium, calcium, lithium, sodium, and/or potassium, poly(ethylene-co-acrylic acid), poly(ethylene-co-acrylic acid) fractional neutralized with magnesium, calcium, lithium, sodium, and/or potassium, poly(acrylamide-co-acrylic acid), poly(acrylamide-co-acrylic acid) fractional neutralized with magnesium, calcium, lithium, sodium, and/or potassium, polystyrene-block-poly(acrylic acid), polystyrene-block-poly(acrylic acid) fractional neutralized with magnesium, calcium, lithium, sodium, and/or potassium, poly(N-isopropylacrylamide-co-acrylic acid), poly(N-isopropylacrylamide-co-acrylic acid) fractional neutralized with magnesium, calcium, lithium, sodium, and/or potassium, and combinations thereof.

In one aspect, the polyacrylate binder may have a molecular weight greater than or equal to about 200,000 g/mol to less than or equal to about 500,000 g/mol.

In one aspect, the second electrode may include greater than or equal to about 0.5 wt. % to less than or equal to about 5 wt. % of the polyacrylate binder.

In one aspect, the second electrode may further include greater than or equal to about 0.1 wt. % to less than or equal to about 5 wt. % of a conductive additive.

In one aspect, the second electrode may include greater than or equal to about 10 wt. % to less than or equal to about 50 wt. % of the silicon-containing electroactive material.

In one aspect, the second electrode may further include a carbonaceous electroactive material.

In one aspect, the second electrode may include greater than or equal to about 10 wt. % to less than or equal to about 50 wt. % of the silicon-containing electroactive material, and greater than or equal to about 40 wt. % to less than or equal to about 80 wt. % of the carbonaceous electroactive material.

In various aspects, the present disclosure provides a method for forming a silicon-containing electrode. The method may include disposing an electrode forming slurry having a temperature greater than or equal to about 4° C. to less than or equal to about 15° C. one or near a surface of a current collector to form the electrode. The electrode forming slurry may include a silicon-containing electroactive material and a polyacrylate binder.

In one aspect, the method may further include, prior to disposing the electrode forming slurry, holding the electrode forming slurry at the temperature for a holding duration.

In one aspect, the polyacrylate binder may have a molecular weight greater than or equal to about 250,000 g/mol to less than or equal to about 500,000 g/mol and may be formed from monomers selected from the group consisting of:

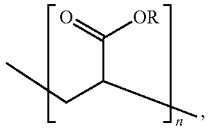

R = H, Li, Na, K, Mg, or Ca

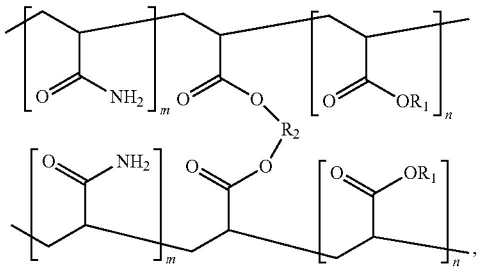

$R_1$ = H, Li, Na, or K; $R_2$ = Mg or Ca

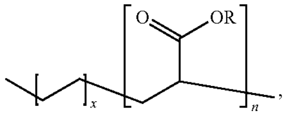

R = H, Li, Na, K, Mg, or Ca

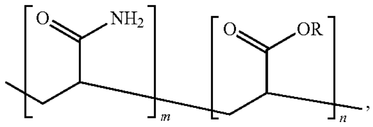

R = H, Li, Na, K, Mg, or Ca

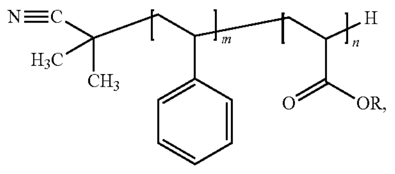

R = H, Li, Na, K, Mg, or Ca

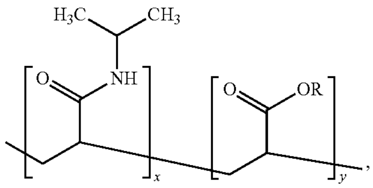

R = H, Li, Na, K, Mg, or Ca and combinations thereof.

In one aspect, the electrode forming slurry may further include a conductive additive.

In one aspect, the electrode forming slurry may further include a carbonaceous electroactive material.

Corresponding reference numerals indicate corresponding parts throughout the several views of the drawings.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
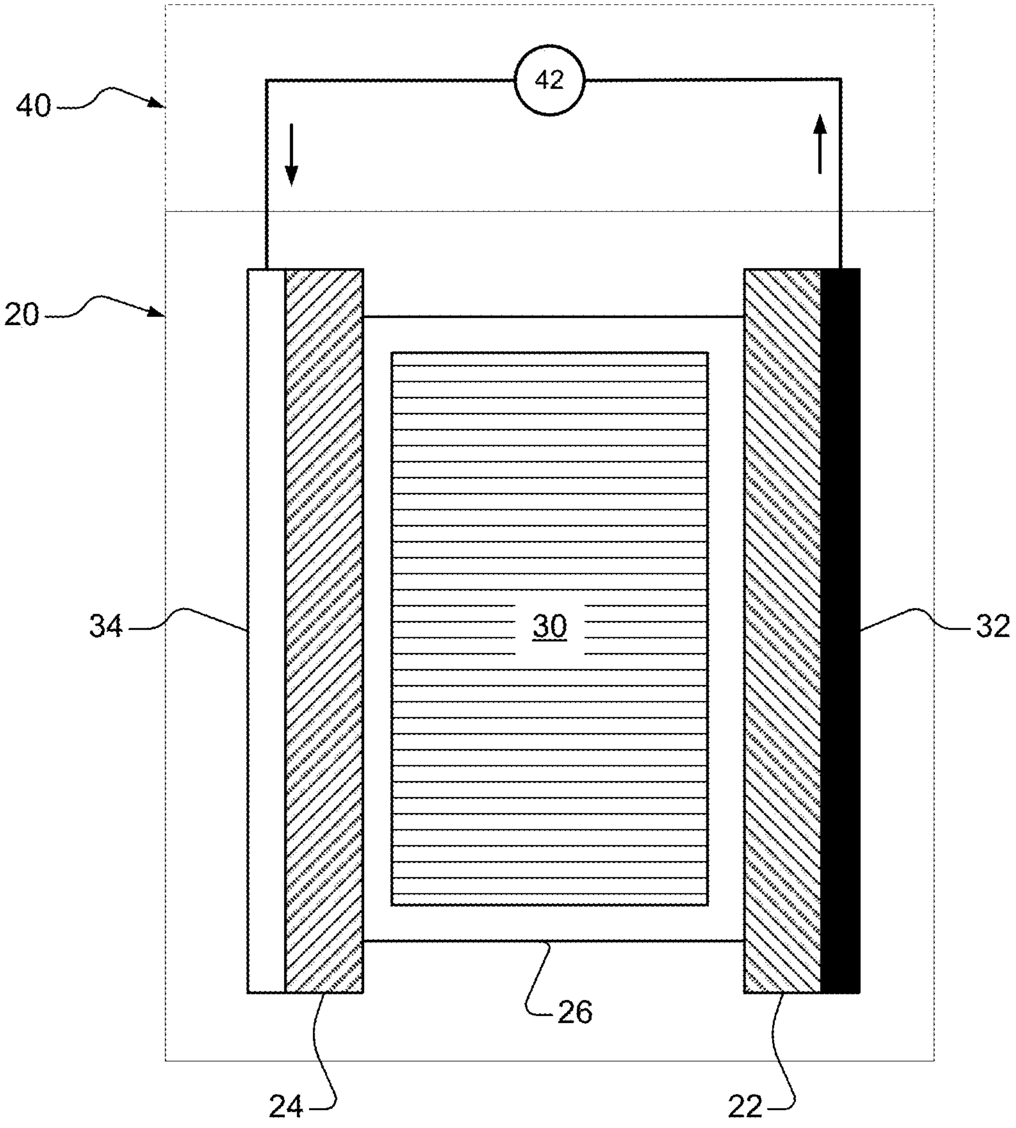
FIG. 1 is an illustration of an example electrochemical cell including a silicon-containing electrode in accordance with various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected, or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates both exactly or precisely the stated numerical value, and also, that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology relates to electrochemical cells including silicon-containing electrodes and also, to methods of forming and using the same. Such cells can be used in vehicle or automotive transportation applications (e.g., motorcycles, boats, tractors, buses, motorcycles, mobile homes, campers, and tanks). However, the present technology may also be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. Further, although the illustrated examples detail below include a single positive electrode cathode and a single anode, the skilled artisan will recognize that the present teachings also extend to various other configurations, including those having one or more cathodes and one or more anodes, as well as various current collectors with electroactive layers disposed on or adjacent to one or more surfaces thereof.

An exemplary and schematic illustration of an electrochemical cell (also referred to as a battery) 20 is shown in FIG. 1. The battery 20 includes a negative electrode 22 (e.g., anode), a positive electrode 24 (e.g., cathode), and a separator 26 disposed between the two electrodes 22, 24. The separator 26 provides electrical separation—prevents physical contact—between the electrodes 22, 24. The separator 26 also provides a minimal resistance path for internal passage of lithium ions, and in certain instances, related anions, during cycling of the lithium ions. In various aspects, the separator 26 comprises an electrolyte 30 that may, in certain aspects, also be present in the negative electrode 22 and/or the positive electrode 24, so as to form a continuous electrolyte network. In certain variations, the separator 26 may be formed by a solid-state electrolyte or a semi-solid-state electrolyte (e.g., gel electrolyte). For example, the separator 26 may be defined by a plurality of solid-state electrolyte particles. In the instance of solid-state batteries and/or semi-solid-state batteries, the positive electrode 24 and/or the negative electrode 22 may include (additionally or alternatively) a plurality of solid-state electrolyte particles. The plurality of solid-state electrolyte particles included in, or defining, the separator 26 may be the same as or different from the plurality of solid-state electrolyte particles included in the positive electrode 24 and/or the negative electrode 22.

A first current collector 32 (e.g., a negative current collector) may be positioned at or near the negative electrode 22. The first current collector 32 together with the negative electrode 22 may be referred to as a negative electrode assembly. Although not illustrated, the skilled artisan will appreciate that, in certain variations, negative electrodes 22 (also referred to as negative electroactive material layers) may be disposed on one or more parallel sides of the first current collector 32. Similarly, the skilled artisan will appreciate that, in other variations, a negative electroactive material layer may be disposed on a first side of the first current collector 32, and a positive electroactive material layer may be disposed on a second side of the first current collector 32. In each instance, the first current collector 32 may be a metal foil, metal grid or screen, or expanded metal comprising copper or any other appropriate electrically conductive material known to those of skill in the art.

A second current collector 34 (e.g., a positive current collector) may be positioned at or near the positive electrode 24. The second current collector 34 together with the positive electrode 24 may be referred to as a positive electrode assembly. Although not illustrated, the skilled artisan will appreciate that, in certain variations, positive electrodes 24 (also referred to as positive electroactive material layers) may be disposed on one or more parallel sides of the second current collector 34. Similarly, the skilled artisan will appreciate that, in other variations, a positive electroactive material layer may be disposed on a first side of the second current collector 34, and a negative electroactive material layer may be disposed on a second side of the second current collector 34. In each instance, the second electrode current collector 34 may be a metal foil, metal grid or screen, or expanded metal comprising aluminum or any other appropriate electrically conductive material known to those of skill in the art.

The first current collector 32 and the second current collector 34 may respectively collect and move free electrons to and from an external circuit 40. For example, an interruptible external circuit 40 and a load device 42 may connect the negative electrode 22 (through the first current collector 32) and the positive electrode 24 (through the second current collector 34). The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode. The chemical potential difference between the positive electrode 24 and the negative electrode 22 drives electrons produced by a reaction, for example, the oxidation of intercalated lithium, at the negative electrode 22 through the external circuit 40 toward the positive electrode 24. Lithium ions that are also produced at the negative electrode 22 are concurrently transferred through the electrolyte 30 contained in the separator 26 toward the positive electrode 24. The electrons flow through the external circuit 40 and the lithium ions migrate across the separator 26 containing the electrolyte 30 to form intercalated lithium at the positive electrode 24. As noted above, the electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back toward the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the first current collector 32, negative electrode 22, separator 26, positive electrode 24, and second current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 shown in FIG. 1 includes a liquid electrolyte 30 and shows representative concepts of battery operation. However, the present technology also applies to solid-state batteries and/or semi-solid state batteries that include solid-state electrolytes and/or solid-state electrolyte particles and/or semi-solid electrolytes and/or solid-state electroactive particles that may have different designs as known to those of skill in the art.

The size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24 may be used in the lithium-ion battery 20. For example, in certain aspects, the electrolyte 30 may be a non-aqueous liquid electrolyte solution (e.g., >1 M) that includes a lithium salt dissolved in an organic solvent or a mixture of organic solvents. Numerous conventional non-aqueous liquid electrolyte 30 solutions may be employed in the battery 20.

A non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis (oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide ($LiN(FSO_2)_2$) (LiSFI), and combinations thereof. These and other similar lithium salts may be dissolved in a variety of non-aqueous aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC), vinylene carbonate (VC), and the like), linear carbonates (e.g., dimethyl carbonate (DMC), diethyl carbonate (DEC), ethylmethylcarbonate (EMC), and the like), aliphatic carboxylic esters (e.g., methyl formate, methyl acetate, methyl propionate, and the like), γ-lactones (e.g., γ-butyrolactone, γ-valerolactone, and the like), chain structure ethers (e.g., 1,2-dimethoxyethane, 1-2-diethoxyethane, ethoxymethoxyethane, and the like), cyclic ethers (e.g., tetrahydrofuran, 2-methyltetrahydrofuran, 1,3-dioxolane, and the like), sulfur compounds (e.g., sulfolane), and combinations thereof.

The separator 26 may be a porous separator. For example, in certain instances, the separator 26 may be a microporous polymeric separator including, for example, a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of polyethylene (PE) and polypropylene (PP), or multi-layered structured porous films of PE and/or PP. Commercially available polyolefin porous separator membranes 26 include CELGARD® 2500 (a monolayer polypropylene separator) and CELGARD® 2320 (a trilayer polypropylene/polyethylene/polypropylene separator) available from Celgard LLC.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics.

In certain aspects, the separator 26 may further include one or more of a ceramic material and a heat-resistant material. For example, the separator 26 may also be admixed with the ceramic material and/or the heat-resistant material, or one or more surfaces of the separator 26 may be coated with the ceramic material and/or the heat-resistant material. In certain variations, the ceramic material and/or the heat-resistant material may be disposed on one or more sides of the separator 26. The ceramic material may be selected from the group consisting of: alumina ($Al_2O_3$), silica ($SiO_2$), and combinations thereof. The heat-resistant material may be selected from the group consisting of: Nomex, Aramid, and combinations thereof.

Various conventionally available polymers and commercial products for forming the separator 26 are contemplated, as well as the many manufacturing methods that may be employed to produce such a microporous polymer separator 26. In each instance, the separator 26 may have an average thickness greater than or equal to about 1 micrometer (μm) to less than or equal to about 50 μm, and in certain instances, optionally greater than or equal to about 1 μm to less than or equal to about 20 μm.

In various aspects, the porous separator 26 and/or the electrolyte 30 disposed in the porous separator 26 as illustrated in FIG. 1 may be replaced with a solid-state electrolyte ("SSE") and/or semi-solid-state electrolyte (e.g., gel) that functions as both an electrolyte and a separator. For example, the solid-state electrolyte and/or semi-solid-state electrolyte may be disposed between the positive electrode 24 and negative electrode 22. The solid-state electrolyte and/or semi-solid-state electrolyte facilitates transfer of lithium ions, while mechanically separating and providing electrical insulation between the negative and positive electrodes 22, 24. By way of non-limiting example, the solid-state electrolyte and/or semi-solid-state electrolyte may include a plurality of fillers, such as $LiTi_2(PO_4)_3$, $LiGe_2(PO_4)_3$, $Li_7La_3Zr_2O_{12}$, $Li_3xLa_{2/3}$-$xTiO_3$, $Li_3PO_4$, $Li_3N$, $Li_4GeS_4$, $Li_{10}GeP_2S_{12}$, $Li_2S—P_2S_5$, $Li_6PS_5Cl$, $Li_6PS_5Br$, $Li_6PS_5I$, $Li_3OCl$, $Li_{2.99}Ba_{0.005}ClO$, or combinations thereof. The semi-solid-state electrolyte may include a polymer host and a liquid electrolyte. The polymer host may include, for example, polyvinylidene fluoride (PVDF), polyvinylidene fluoride-hexafluoropropylene (PVDF-HFP), polyethylene oxide (PEO), polypropylene oxide (PPO), polyacrylonitrile (PAN), polymethacrylonitrile (PMAN), polymethyl methacrylate (PMMA), carboxymethyl cellulose (CMC), poly (vinyl alcohol) (PVA), polyvinylpyrrolidone (PVP), and combinations thereof. In certain variations, the semi-solid or gel electrolyte may also be found in the positive electrode 24 and/or the negative electrodes 22.

The negative electrode 22 is formed from a lithium host material that is capable of functioning as a negative terminal of a lithium-ion battery. In various aspects, the negative electrode 22 may be defined by a plurality of negative electroactive material particles. The negative electroactive material particles may be disposed in one or more layers so as to define the three-dimensional structure of the negative electrode 22. The electrolyte 30 may be introduced, for example after cell assembly, and contained within pores of the negative electrode 22 (i.e., spaces between the negative electroactive material particles). For example, in certain variations, the negative electrode 22 may include a plurality of solid-state electrolyte particles dispersed with the negative electroactive material particles. In each instance, the negative electrode 22 (including the one or more layers) may have a thickness greater than or equal to about 30 μm to less than or equal to about 500 μm, and in certain aspects, optionally greater than or equal to about 50 μm to less than or equal to about 100 μm.

In certain variations, the negative electroactive material particles may include silicon-containing (or silicon-based) electroactive materials. The silicon-containing electroactive materials may include silicon, lithium-silicon alloys, and other silicon-containing binary an/or ternary alloys. For example, in certain variations, the silicon-containing electroactive material may include elemental silicon (Si), various lithium silicide phases ($Li_xSi_y$, where $0<x<17$ and $1<y<4$), silicon nanograins embedded in a silicon oxide ($SiO_x$, where $0<x<2$) matrix, lithium doped silicon oxide ($Li_ySiO_x$, where $0<x<2$ and $1<y<3$), and combinations thereof.

In certain variations, the negative electrode 22 may be a composite electrode including a combination of negative electroactive materials. For example, the negative electrode 22 may include a first negative electroactive material and a second negative electroactive material. A ratio of the first negative electroactive material to the second negative electroactive material may be greater than or equal to about 5:95 to less than or equal to about 95:5. In certain variations, the first negative electroactive material may be a volume-expanding material including, for example, silicon; and the second negative electroactive material may include a carbonaceous material (e.g., graphite, hard carbon, and/or soft carbon). In certain variations, the negative electrode 22 may include greater than or equal to about 10 wt. % to less than or equal to about 50 wt. % of the silicon-containing electroactive material and greater than or equal to about 40 wt. % to less than or equal to about 90 wt. %, and in certain aspects, optionally greater than or equal to about 40 wt. % to less than or equal to about 80 wt. %, of the carbonaceous electroactive material. For example, the negative electroactive material may include a carbonaceous-silicon based composite including, for example, about 10 wt. % of a constrained nano-silicon material (e.g., $SiO_x$, where $0\leq x\leq 2$) and about 90 wt. % the carbonaceous material (e.g., graphite).

In various aspects, the negative electroactive material may be intermingled with an electronically conductive material (i.e. conductive additive) that provide an electron conductive path. For example, the negative electrode 22 may include greater than or equal to about 80 wt. % to less than or equal to about 97 wt. %, of the negative electroactive material; and greater than or equal to about 0.1 wt. % to less than or equal to about 5 wt. %, and in certain aspects, optionally greater than or equal to about 1 wt. % to less than or equal to about 5 wt. %, of the electronically conducting material. Example conductive additives include, for example, carbon-based materials, powdered nickel or other metal particles, or conductive polymers. Carbon-based materials may include, for example, particles of graphite, acetylene black (such as KETCHEN™ black or DENKA™ black), carbon nanofibers and nanotubes (e.g., single wall carbon nanotubes (SWCNT), multiwall carbon nanotubes (MWCNT)), graphene (e.g., graphene platelets (GNP), oxidized graphene platelets), conductive carbon blacks (such as, SuperP (SP)), and the like. Examples conductive polymers include polyaniline (PANi), polythiophene, polyacetylene, polypyrrole (PPy), and the like.

In various aspects, the negative electroactive material (and also the electronically conductive material) may be intermingled with a polyacrylate binder. For example, the negative electrode 22 may include greater than or equal to about 0.5 wt. % to less than or equal to about 5 wt. %, optionally greater than or equal to about 1 wt. % to less than or equal to about 4 wt. %, and in certain aspects, optionally greater than or equal to about 2 wt. % to less than or equal to about 4 wt. %, of the polyacrylate binder. The polyacrylate binder may have limited swelling (for example, lithiated polyacrylate binder with an acrylamide copolymer (referred to as LiPAA-1) may experience swelling of about 5.0%, styrene-butadiene rubber (SBR) may experience swelling of about 10.0%, and lithiated polyacrylate binder (referred to as LiPAA-2) may experience swelling of about 29.2%) when contacted to a non-aqueous liquid electrolyte solution (e.g., electrolyte 30), so that of the more electrolyte solution volume is available for transport, and also, so there is limited deterioration in mechanical properties of the negative electrode 22. The polyacrylate binder may also experience improve adhesion with the negative electroactive materials and also with the electronically conductive material.

The polyacrylate binder may include, for example, poly(acrylic acid), poly(ethylene-co-acrylic acid), poly(acrylamide-co-acrylic acid), polystyrene-block-poly(acrylic acid), poly(N-isopropylacrylamide-co-acrylic acid), and combinations thereof.

In certain variations, the poly(acrylic acid), poly(ethylene-co-acrylic acid), poly(acrylamide-co-acrylic acid), polystyrene-block-poly(acrylic acid), and/or poly(N-isopropylacrylamide-co-acrylic acid) may be fractional neutralized with magnesium and/or calcium. In certain variations, the poly(acrylic acid), poly(ethylene-co-acrylic acid), poly(acrylamide-co-acrylic acid), polystyrene-block-poly(acrylic acid), and/or poly(N-isopropylacrylamide-co-acrylic acid) may be fractional neutralized with magnesium or calcium. In certain variations, the poly(acrylic acid), poly(ethylene-co-acrylic acid), poly(acrylamide-co-acrylic acid), polystyrene-block-poly(acrylic acid), and/or poly(N-isopropylacrylamide-co-acrylic acid) may be fractional neutralized with magnesium and calcium.

In certain variations, the poly(acrylic acid), poly(ethylene-co-acrylic acid), poly(acrylamide-co-acrylic acid), polystyrene-block-poly(acrylic acid), and/or poly(N-isopropylacrylamide-co-acrylic acid) may be factionally neutralized with lithium, sodium, and/or potassium. In certain variations, the poly(acrylic acid), poly(ethylene-co-acrylic acid), poly(acrylamide-co-acrylic acid), polystyrene-block-poly(acrylic acid), and/or poly(N-isopropylacrylamide-co-acrylic acid) may be factionally neutralized with lithium, sodium, or potassium. In certain variations, the poly(acrylic acid), poly(ethylene-co-acrylic acid), poly(acrylamide-co-acrylic acid), polystyrene-block-poly(acrylic acid), and/or poly(N-isopropylacrylamide-co-acrylic acid) may be factionally neutralized with lithium, sodium, and potassium.

For example, the polyacrylate binder may include:

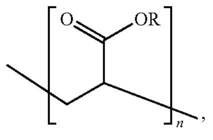

R = H, Li, Na, K, Mg, or Ca

-continued

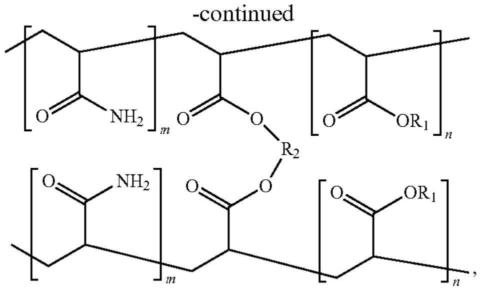

$R_1$ = H, Li, Na, or K; $R_2$ = Mg or Ca

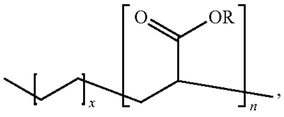

R = H, Li, Na, K, Mg, or Ca

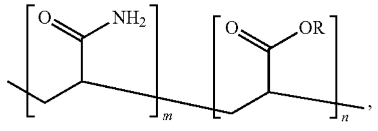

R = H, Li, Na, K, Mg, or Ca

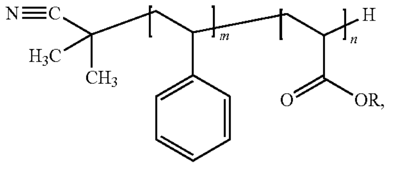

R = H, Li, Na, K, Mg, or Ca

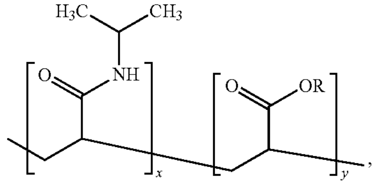

R = H, Li, Na, K, Mg, or Ca and combinations thereof.

In various aspects, the polyacrylate binder may be selected from the group consisting of: poly(acrylic acid), poly(acrylic acid) fractional neutralized with magnesium, calcium, lithium, sodium, and/or potassium, poly(ethylene-co-acrylic acid), poly(ethylene-co-acrylic acid) fractional neutralized with magnesium, calcium, lithium, sodium, and/or potassium, poly(acrylamide-co-acrylic acid), poly(acrylamide-co-acrylic acid) fractional neutralized with magnesium, calcium, lithium, sodium, and/or potassium, poly styrene-block-poly (acrylic acid), polystyrene-block-poly (acrylic acid) fractional neutralized with magnesium, calcium, lithium, sodium, and/or potassium, poly(N-isopropylacrylamide-co-acrylic acid), poly(N-isopropylacrylamide-co-acrylic acid) fractional neutralized with magnesium, calcium, lithium, sodium, and/or potassium, and combinations thereof.

In various aspects, the polyacrylate binder may be selected from the group consisting of: poly(acrylic acid), poly(acrylic acid) fractional neutralized with magnesium, calcium, lithium, sodium, or potassium, poly(ethylene-co-acrylic acid), poly(ethylene-co-acrylic acid) fractional neutralized with magnesium, calcium, lithium, sodium, or potassium, poly(acrylamide-co-acrylic acid), poly(acrylamide-co-acrylic acid) fractional neutralized with magnesium, calcium, lithium, sodium, or potassium, polystyrene-blockpoly(acrylic acid), polystyrene-block-poly(acrylic acid) fractional neutralized with magnesium, calcium, lithium, sodium, or potassium, poly(N-isopropylacrylamide-co-acrylic acid), poly(N-isopropylacrylamide-co-acrylic acid) fractional neutralized with magnesium, calcium, lithium, sodium, or potassium, and combinations thereof.

In various aspects, the polyacrylate binder may be selected from the group consisting of: poly(acrylic acid); poly(acrylic acid) fractional neutralized with at least one of magnesium, calcium, lithium, sodium, and potassium; poly (ethylene-co-acrylic acid); poly(ethylene-co-acrylic acid) fractional neutralized with at least one of magnesium, calcium, lithium, sodium, and potassium; poly(acrylamide-co-acrylic acid); poly(acrylamide-co-acrylic acid) fractional neutralized with at least one of magnesium, calcium, lithium, sodium, and potassium; polystyrene-block-poly (acrylic acid); polystyrene-block-poly(acrylic acid) fractional neutralized with at least one of magnesium, calcium, lithium, sodium, and potassium; poly(N-isopropylacrylamide-co-acrylic acid); poly(N-isopropylacrylamide-co-acrylic acid) fractional neutralized with at least one of magnesium, calcium, lithium, sodium, and potassium; and combinations thereof.

In each variation, the polyacrylate binder may have a molecular weight (e.g., weighted average) of greater than or equal to about 100,000 g/mol to less than or equal to about 5,000,000 g/mol, optionally greater than or equal to about 200,000 g/mol to less than or equal to about 500,000 g/mol, and in certain aspects, optionally greater than or equal to about 250,000 g/mol to less than or equal to about 500,000 g/mol. The polyacrylate binder may have limited swelling when contacted to the electrolyte 30.

The positive electrode 24 is formed from a lithium-based active material that is capable of undergoing lithium intercalation and deintercalation, alloying and dealloying, or plating and stripping, while functioning as the positive terminal of a lithium-ion battery. The positive electrode 24 can be defined by a plurality of electroactive material particles. Such positive electroactive material particles may be disposed in one or more layers so as to define the three-dimensional structure of the positive electrode 24. The electrolyte 30 may be introduced, for example after cell assembly, and contained within pores of the positive electrode 24. In certain variations, the positive electrode 24 may include a plurality of solid-state electrolyte particles. In each instance, the positive electrode 24 may have an average thickness greater than or equal to about 1 μm to less than or equal to about 500 μm, and in certain aspects, optionally greater than or equal to about 10 μm to less than or equal to about 200 μm.

In various aspects, the positive electroactive material includes a layered oxide represented by $LiMeO_2$, where Me is a transition metal, such as cobalt (Co), nickel (Ni), manganese (Mn), iron (Fe), aluminum (Al), vanadium (V), or combinations thereof. In other variations, the positive electroactive material includes an olivine-type oxide represented by $LiMePO_4$, where Me is a transition metal, such as cobalt (Co), nickel (Ni), manganese (Mn), iron (Fe), aluminum (Al), vanadium (V), or combinations thereof. In still other variations, the positive electroactive material includes a monoclinic-type oxide represented by $Li_3Me_2(PO_4)_3$, where Me is a transition metal, such as cobalt (Co), nickel (Ni), manganese (Mn), iron (Fe), aluminum (Al), vanadium (V), or combinations thereof. In still other variations, the positive electroactive material includes a spinel-type oxide represented by $LiMe_2O_4$, where Me is a transition metal, such as cobalt (Co), nickel (Ni), manganese (Mn), iron (Fe), aluminum (Al), vanadium (V), or combinations thereof. In still other variations, the positive electroactive material includes a tavorite represented by $LiMeSO_4F$ and/or $LiMePO_4F$, where Me is a transition metal, such as cobalt (Co), nickel (Ni), manganese (Mn), iron (Fe), aluminum (Al), vanadium (V), or combinations thereof. In still further variations, the positive electrode 24 may be a composite electrode including a combination of positive electroactive materials. For example, the positive electrode 24 may include a first positive electroactive material and a second electroactive material. A ratio of the first positive electroactive material to the second positive electroactive material may be greater than or equal to about 5:95 to less than or equal to about 95:5. In certain variations, the first and second electroactive materials may be independently selected from one or more layered oxides, one or more olivine-type oxides, one or more monoclinic-type oxides, one or more spinel-type oxide, one or more tavorite, or combinations thereof.

In each variation, the positive electroactive material may be optionally intermingled (e.g., slurry casted) with an electronically conductive material (i.e., conductive additive) that provides an electron conductive path and/or a polymeric binder material that improves the structural integrity of the positive electrode 24. For example, the positive electrode 24 may include greater than or equal to about 70 wt. % to less than or equal to about 98 wt. %, and in certain aspects, optionally greater than or equal to about 80 wt. % to less than or equal to about 97 wt. %, of the positive electroactive material; greater than or equal to 0 wt. % to less than or equal to about 30 wt. %, and in certain aspects, optionally greater than or equal to about 0.5 wt. % to less than or equal to about 10 wt. %, of the electrically conducting material; and greater than or equal to 0 wt. % to less than or equal to about 20 wt. %, and in certain aspects, optionally greater than or equal to about 0.5 wt. % to less than or equal to about 10 wt. %, of the polymeric binder. The conductive additive as included in the positive electrode 24 may be the same as or different from the conductive additive as included in the negative electrode 22. Like the negative electrode 22, the binder material as included in the positive electrode 24 may be a polyacrylate binder. The polyacrylate binder as included in the positive electrode 24 may be the same as or different from the polyacrylate binder as included in the negative electrode 22.

In various aspects, the present disclosure provides methods for forming silicon-containing electrodes, like the negative electrode 22 illustrated in FIG. 1. Silicon-containing electrodes are often difficult to prepare because elemental silicon readily reacts with water during slurry formation to form hydrogen gas, resulting in the formation of as-disposed electrodes having non-uniformed topographies (e.g., stripe, corduroy patterns) with pinholes, and also, non-uniformed current densities in cells including the formed electrodes. Further, slurries for the formation of silicon-containing electrodes often have poor storage stability because of changes in viscosity and electrode structure as the result of sedimentation and thinning. The present disclosure proposes a low-temperature slurry process that limits hydrogen gas formation, and also, it has been demonstrated (as detailed below) that the presence of polyacrylate binders in the electrode slurry improves the storage stability of the electrode-forming slurry.

Figure 2A:
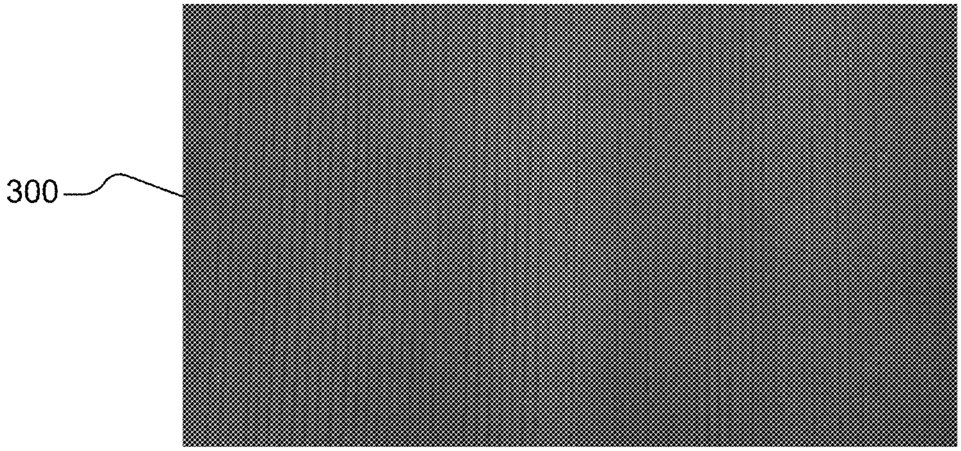
FIG. 2A is a top-down image of a silicon-containing electrode prepared using a room temperature slurry formation process.
Figure 2B:
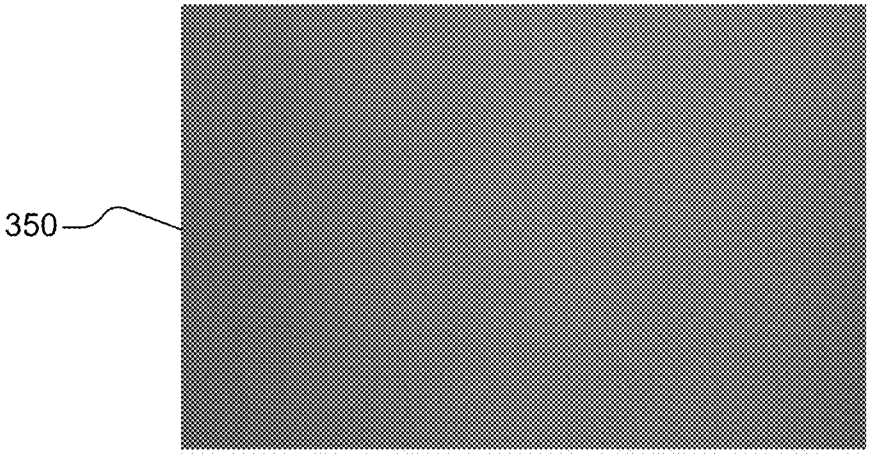
FIG. 2B is a top-down image of a silicon-containing electrode prepared using a low-temperature process in accordance with various aspects of the present disclosure.

In various aspects, the low-temperature slurry process includes disposing an electrode forming slurry having a temperature greater than or equal to about 4° C. to less than or equal to about 15° C. on or near one or more surfaces of a current collector (like the current collector 32 illustrated in FIG. 1). In certain variations, the method may also include, prior to disposing the electrode forming slurry on or near the one or more surfaces of the current collector, holding the electrode forming slurry at the temperature for a holding duration. For example, in certain variations, the electrode formation slurry may be held at the low temperature from first contact of the slurry components (e.g., silicon-containing electroactive material and/or conductive additive and/or polyacrylate binder and a solvent, such as water) until and during the formation slurry is disposed on the current collector to form the electrode. The low-temperature method may suppress bubble formation because of decreases in chemical reaction rate and also because of the increased gas solubility and increase surface tension of water at the lower temperature as a result of viscosity changes. In certain variations, for every 10° C. change the chemical reaction rate may decrease by a factor of about 2. By way of comparison only, FIG. 2A is a top-down image of a silicon-containing electrode 300 prepared using a room temperature (e.g., about 25° C.) slurry formation process, and FIG. 2B is a top-down image of a silicon-containing electrode 350 prepared using a low temperature slurry (e.g., greater than or equal to about 4° C. to less than or equal to about 15° C.) formation process as detailed above. As illustrated, the silicon-containing electrode 300 has a strip or corduroy pattern, while the silicon-containing electrode 350 has a smooth surface.

Certain features of the current technology are further illustrated in the following non-limiting examples.

Example 1

Example batteries and battery cells may be prepared in accordance with various aspects of the present disclosure. For example, an example slurry 410 including a polyacrylate binder is provided. By way of comparison, a comparison slurry 450 including a styrene-butadiene rubber (SBR) binder is provided. The example slurry 410 and the comparison slurry 450 may each include about 3.9 wt. % of the respective binder together with about 95 wt. % of a silicon-containing electroactive material and about 1.1 wt. % of a conductive additive (e.g., about 1 wt. % of SuperP and about 0.1% of single-wall carbon nanotubes (SWCNT)). The example slurry 410 and the comparison slurry 450 may each have a solids content of about 45%.

Figure 3A:
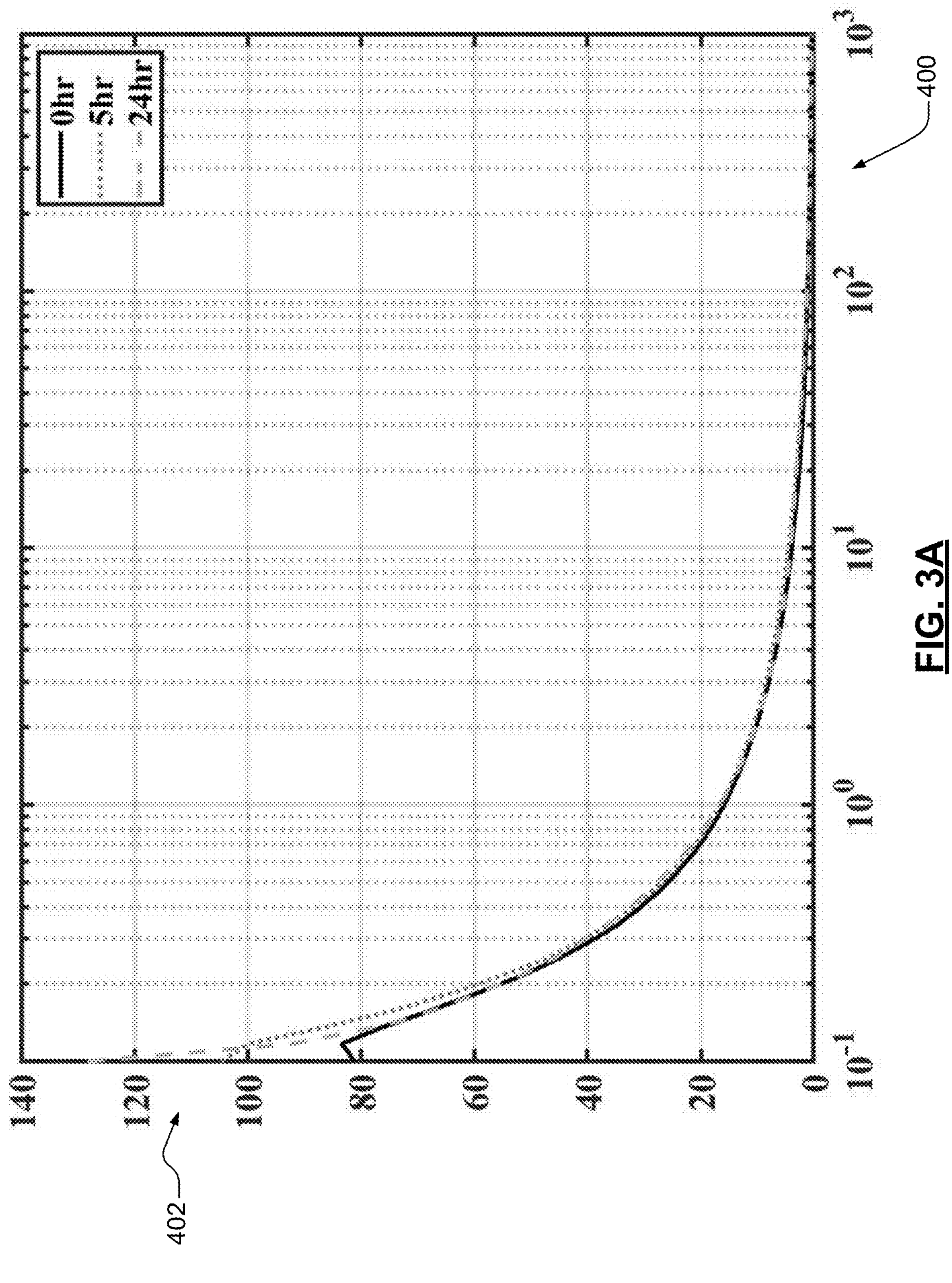
FIG. 3A is a graphical illustration demonstrating viscosity changes over time for an example electrode-forming slurry prepared in accordance with various aspects of the present disclosure.

FIG. 3A is a graphical illustration demonstrating viscosity changes of the example slurry 410, where the x-axis 400 represents shear rate ($s^{-1}$), and the y-axis 402 represents viscosity (Pa·s). As illustrated, there is almost no viscosity change over a twenty-four hour mixing period. The example slurry 410 including the polyacrylate binder has improve storage stability.

Figure 3B:
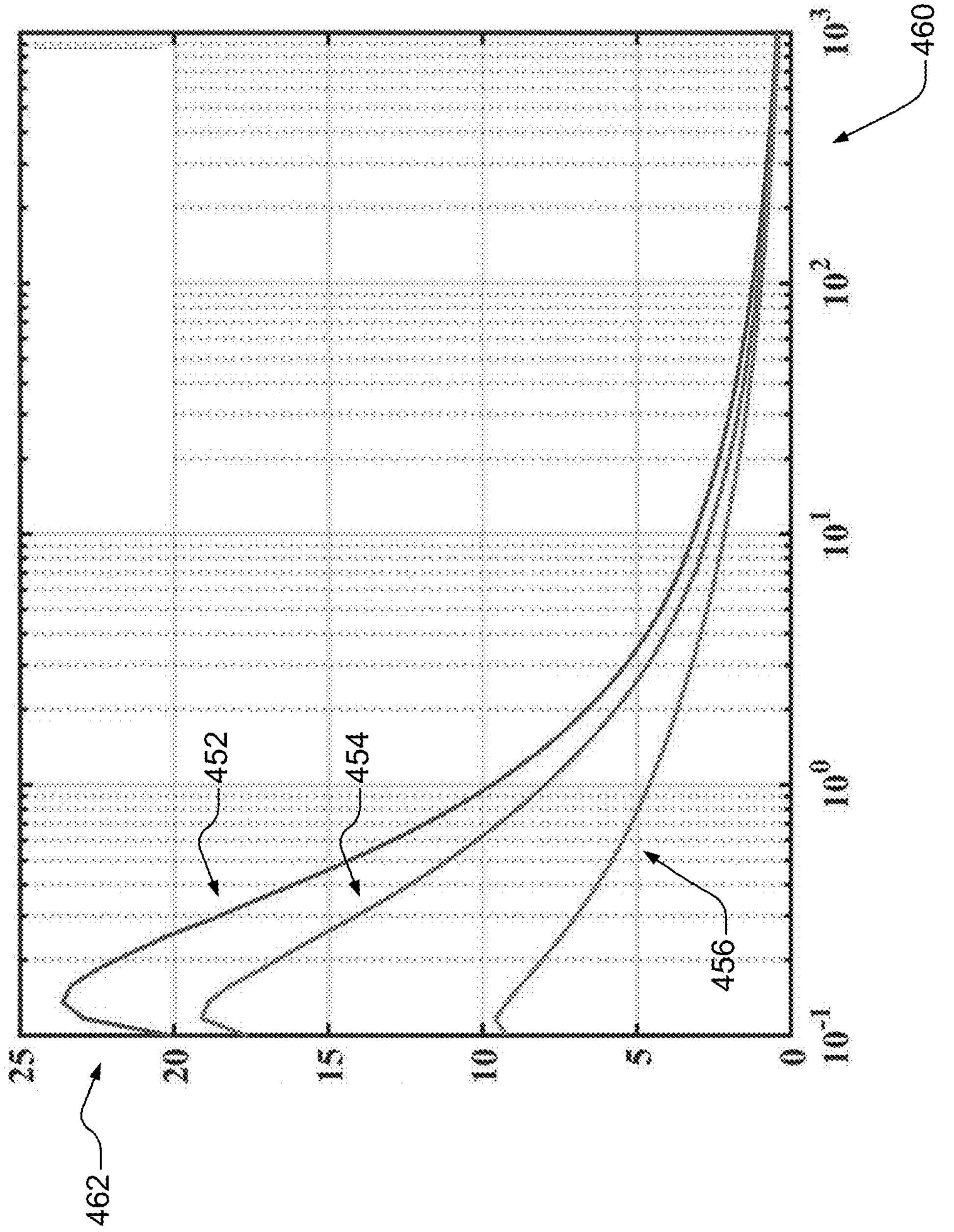
FIG. 3B is a graphical illustration demonstrating viscosity changes over time of a comparative electrode-forming slurry.

FIG. 3B is a graphical illustration demonstrating viscosity changes of the comparison slurry 450, where the x-axis 460 represents shear rate ($s^{-1}$), and the y-axis 462 represents viscosity (Pa·s). As illustrated (line 452 representing zero hours, line 454 representing five hours, and line 456 representing twenty-four hours), viscosity of the comparison slurry 450 gradually decreases over the twenty-four hour mixing period.

Example 2

Figure 4:
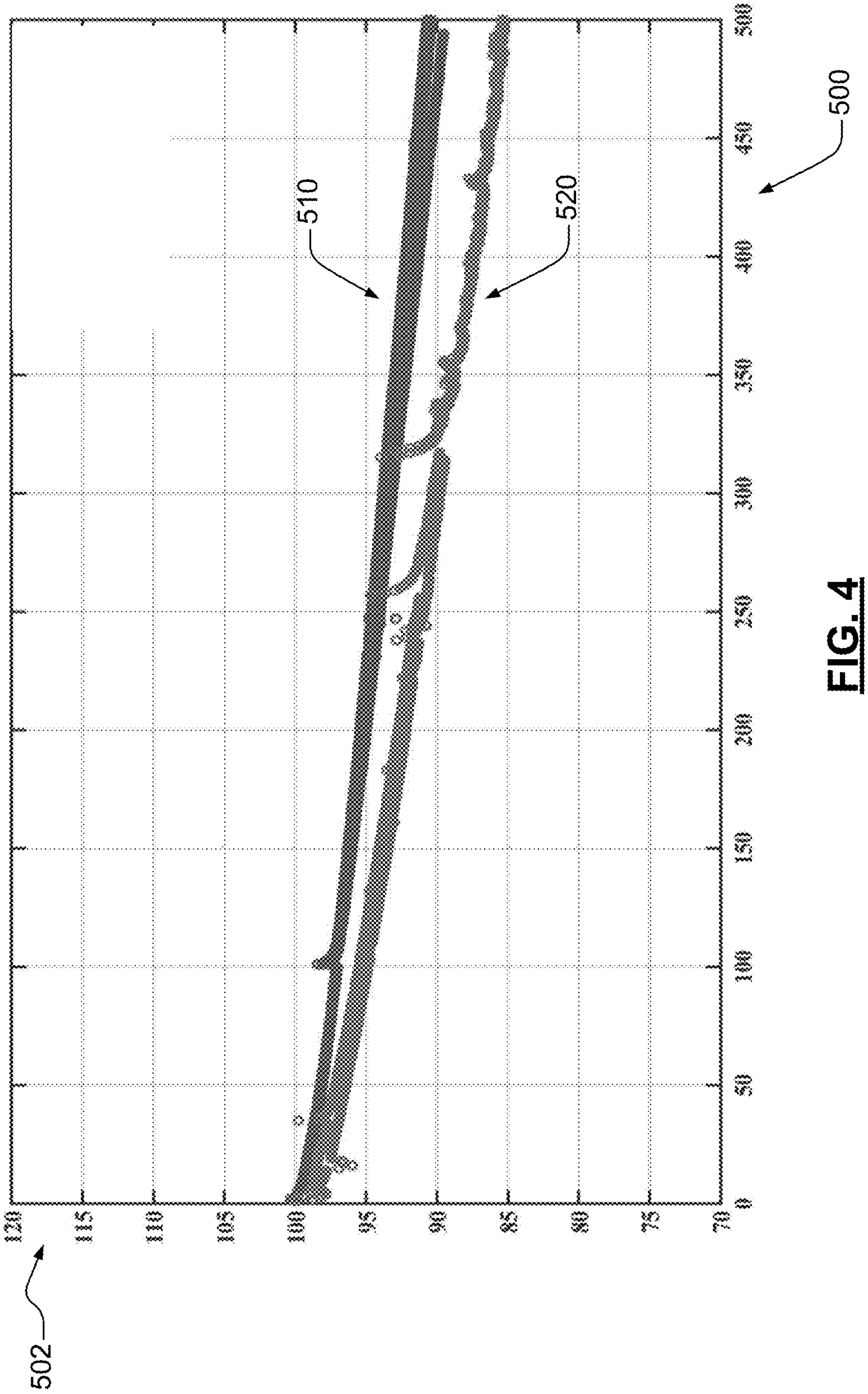
FIG. 4 is a graphical illustration demonstrating the capacity retention of an example cell including a silicon-containing electrode prepared in accordance with various aspects of the present disclosure.

Example batteries and battery cells may be prepared in accordance with various aspects of the present disclosure. For example, an example cell 510 may include a silicon-containing negative electrode that includes a polyacrylate binder in accordance with various aspects of the present disclosure. By way of comparison, an example comparative cell 520 including a silicon-containing negative electrode that includes a styrene-butadiene rubber (SBR) binder. The negative electrodes of the example cell 510 and the comparative cell 520 may be blended anodes including, for example, about 20 wt. % of silicon and about 80 wt. % of graphite. The negative electrodes of the example cell 510 and the comparative cell 520 may each have a loading of about 5.5 mAh/$cm^2$. The example cell 510 and the comparative cell 520 may each also include a cathode including, for example, $LiNiCoMnAlO_2$ (NCMA) and having a loading of about 5 mAh/$cm^2$. The example cell 510 and the comparative cell 520 may each also include an electrolyte including, for example, 1 M include lithium hexafluorophosphate ($LiPF_6$) in a solvent mixture. The solvent mixture may include ethylene carbonate (EC) and dimethyl carbonate (DMC) and also about 1 wt. % vinylene carbonate (VC) and about 2 wt. % of fluoroethylene carbonate (FEC), FIG. 4 is a graphical illustration demonstrating the capacity retention of the example cell 510 as compared to the comparative cell 520, where the x-axis 500 represents cycle number, and the y-axis 502 represents capacity retention (%). As illustrated, the example cell 510 retains about 90% of the initial capacity after 500 cycles. In contrast, the comparative cell 520 retains only about 85% of the initial capacity after 500 cycles. After 500 cycles, the example cell 510 has a capacity lost that is less than the capacity lost of the comparative cell.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrode for an electrochemical cell that cycles lithium ions, the electrode comprising:

a silicon-containing electroactive material; and a polyacrylate binder having a molecular weight greater than or equal to about 300,000 g/mol to less than or equal to about 500,000 g/mol and formed from a monomer selected from the group consisting of:

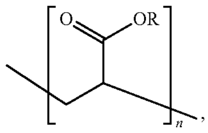

,

R = Mg, or Ca

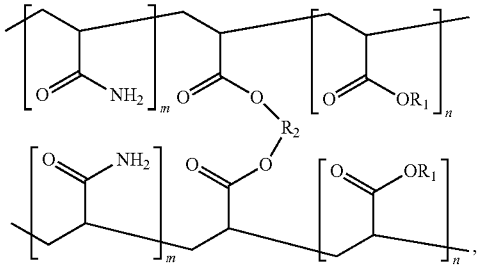

, $R_1$ = H, Li, Na, or K; $R_2$ = Mg or Ca

-continued

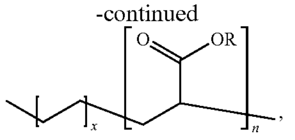

R = Mg, or Ca

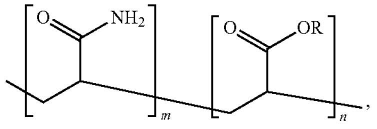

R = H, Li, Na, K, Mg, or Ca

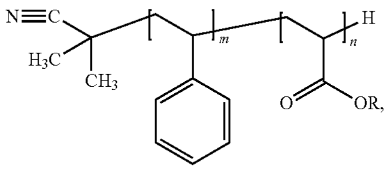

R = H, Li, Na, K, Mg, or Ca

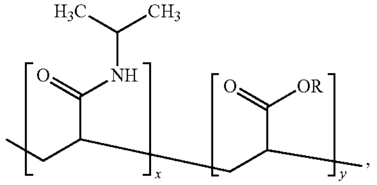

R = H, Li, Na, K, Mg, or Ca and combinations thereof.

2. The electrode of claim 1, wherein the electrode comprises greater than or equal to about 0.5 wt. % to less than or equal to about 5 wt. % of the polyacrylate binder.

3. The electrode of claim 1, wherein the electrode further comprises greater than or equal to about 0.1 wt. % to less than or equal to about 5 wt. % of a conductive additive.

4. The electrode of claim 1, wherein the electrode comprises greater than or equal to about 10 wt. % to less than or equal to about 50 wt. % of the silicon-containing electroactive material.

5. The electrode of claim 1, wherein the electrode further comprises a carbonaceous electroactive material.

6. The electrode of claim 5, wherein the electrode comprises greater than or equal to about 10 wt. % to less than or equal to about 50 wt. % of the silicon-containing electroactive material; and greater than or equal to about 40 wt. % to less than or equal to about 80 wt. % of the carbonaceous electroactive material.

7. An electrochemical cell that cycles lithium ions, the electrochemical cell comprising:

a first electrode comprising a positive electroactive material;

a second electrode comprising a negative electroactive material and a polyacrylate binder having a molecular weight greater than or equal to about 300,000 g/mol to less than or equal to about 500,000 g/mol and selected from the group consisting of: poly(acrylic acid) fractional neutralized with magnesium and/or calcium, poly(ethylene-co-acrylic acid), poly(ethylene-co-acrylic acid) fractional neutralized with magnesium and/or calcium, poly(acrylamide-co-acrylic acid), poly (acrylamide-co-acrylic acid) fractional neutralized with magnesium, calcium, lithium, sodium, and/or potassium, polystyrene-block-poly(acrylic acid), polystyrene-block-poly(acrylic acid) fractional neutralized with magnesium, calcium, lithium, sodium, and/or potassium, poly(N isopropylacrylamide-co-acrylic acid), poly(N-isopropylacrylamide-co-acrylic acid) fractional neutralized with magnesium, calcium, lithium, sodium, and/or potassium, and combinations thereof; and a separating layer disposed between the first and second electrodes.

8. The electrochemical cell of claim 7, wherein the polyacrylate binder is a first polyacrylate binder and the first electrode further comprises a second polyacrylate binder selected from the group consisting of: poly(acrylic acid), poly(acrylic acid) fractional neutralized with magnesium, calcium, lithium, sodium, and/or potassium, poly(ethylene-co-acrylic acid), poly(ethylene-co-acrylic acid) fractional neutralized with magnesium, calcium, lithium, sodium, and/or potassium, poly(acrylamide-co-acrylic acid), poly(acrylamide-co-acrylic acid) fractional neutralized with magnesium, calcium, lithium, sodium, and/or potassium, polystyrene-block-poly(acrylic acid), polystyrene-block-poly(acrylic acid) fractional neutralized with magnesium, calcium, lithium, sodium, and/or potassium, poly(N-isopropylacrylamide-co-acrylic acid), poly(N-isopropylacrylamide-co-acrylic acid) fractional neutralized with magnesium, calcium, lithium, sodium, and/or potassium, and combinations thereof.

9. The electrochemical cell of claim 7, wherein the second electrode comprises greater than or equal to about 0.5 wt. % to less than or equal to about 5 wt. % of the polyacrylate binder.

10. The electrochemical cell of claim 7, wherein the second electrode further comprises greater than or equal to about 0.1 wt. % to less than or equal to about 5 wt. % of a conductive additive.

11. The electrochemical cell of claim 7, wherein the second electrode comprises greater than or equal to about 10 wt. % to less than or equal to about 50 wt. % of the negative electroactive material.

12. The electrochemical cell of claim 7, wherein the negative electroactive material comprises a silicon-containing electroactive material and a carbonaceous electroactive material.

13. The electrochemical cell of claim 12, wherein the second electrode comprises greater than or equal to about 10 wt. % to less than or equal to about 50 wt. % of the silicon-containing electroactive material; and greater than or equal to about 40 wt. % to less than or equal to about 80 wt. % of the carbonaceous electroactive material.

14. A method for forming a silicon-containing electrode, the method comprising:

disposing an electrode forming slurry having a temperature greater than or equal to about 4° C. to less than or equal to about 15° C. one or near a surface of a current collector to form the electrode, the electrode forming slurry comprising a silicon-containing electroactive material and a polyacrylate binder having a molecular weight greater than or equal to about 300,000 g/mol to less than or equal to about 500,000 g/mol and formed from monomers selected from the group consisting of:

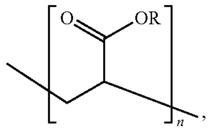

R = Mg, or Ca

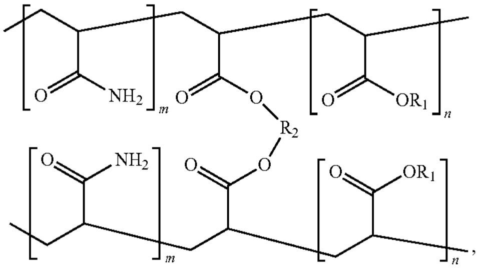

$R_1$ = H, Li, Na, or K; $R_2$ = Mg or Ca

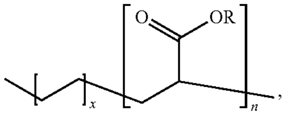

R = Mg, or Ca

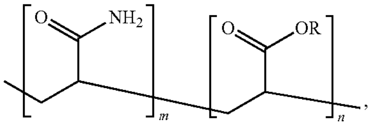

R = H, Li, Na, K, Mg, or Ca

-continued

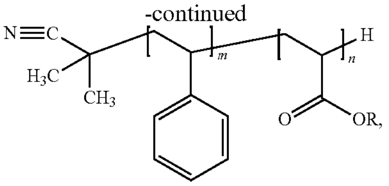

R = H, Li, Na, K, Mg, or Ca

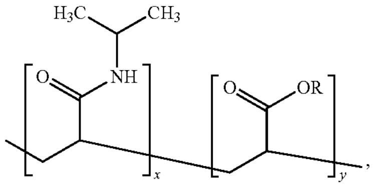

R = H, Li, Na, K, Mg, or Ca and combinations thereof.

15. The method of claim 14, wherein the method further comprises:

prior to disposing the electrode forming slurry, holding the electrode forming slurry at the temperature for a holding duration.

16. The method of claim 5, wherein the electrode forming slurry further comprises a conductive additive.

17. The method of claim 14, wherein the electrode forming slurry further comprises a carbonaceous electroactive material.

* * * * *